(12) United States Patent
Johnson et al.

(10) Patent No.: US 11,096,201 B2
(45) Date of Patent: Aug. 17, 2021

(54) METHOD OF SCHEDULING DOWNLOADS FOR COMMUNICATION DEVICES CONNECTED TO A DOWNLOAD SERVER THROUGH A COMMON ACCESS POINT

(71) Applicant: MOTOROLA SOLUTIONS, INC., Chicago, IL (US)

(72) Inventors: Graeme Johnson, Plantation, FL (US); Blake C Moselle, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 55 days.

(21) Appl. No.: 16/598,094

(22) Filed: Oct. 10, 2019

(65) Prior Publication Data
US 2021/0112577 A1 Apr. 15, 2021

(51) Int. Cl.
| | | |
|---|---|---|
| *H04W 56/00* | (2009.01) |
| *H04W 72/12* | (2009.01) |
| *H04W 76/11* | (2018.01) |
| *H04W 80/02* | (2009.01) |

(52) U.S. Cl.
CPC ... *H04W 72/1273* (2013.01); *H04W 72/1242* (2013.01); *H04W 76/11* (2018.02); *H04W 80/02* (2013.01)

(58) Field of Classification Search
CPC ............. H04W 72/1273; H04W 76/11; H04W 72/1242; H04W 80/02
USPC ........................................................ 370/329
See application file for complete search history.

(56) References Cited

U.S. PATENT DOCUMENTS

| | | |
|---|---|---|
| 8,169,900 B2 | 5/2012 | Castro et al. |
| 8,677,343 B2 | 3/2014 | Averbugh et al. |
| 9,853,899 B2 | 12/2017 | Ringland et al. |
| 2009/0061870 A1* | 3/2009 | Finkelstein ........... H04W 48/20 455/435.2 |

(Continued)

FOREIGN PATENT DOCUMENTS

| | | |
|---|---|---|
| EP | 2683136 A1 | 1/2014 |
| IN | 2713DE2009 A | 10/2011 |
| JP | 2017187892 A | 10/2017 |

OTHER PUBLICATIONS

The International Search Report and the Written Opinion corresponding patent application serial No. PCT/US2020/051359 filed Sep. 18, 2020, dated Nov. 13, 2020, all pages.

*Primary Examiner* — Sai Ming Chan
(74) *Attorney, Agent, or Firm* — Raguraman Kumaresan

(57) ABSTRACT

A process for scheduling downloads for communication devices connected to a download server through a common access point. In operation, the download server receives a download request from a first communication device. The download request includes a unique access point identifier of a first access point through which the first communication device is connected to the download server. The download server identifies an access point record that is linked to the unique access point identifier of the first access point and updates the identified access point record to include the first communication device in a communication devices list included in the identified access point record. When a count of communication devices included in the communication devices list is greater than the predetermined count threshold, the download server delays an execution of a download service corresponding to the download request received from the first communication device.

19 Claims, 7 Drawing Sheets

(56) References Cited

U.S. PATENT DOCUMENTS

2012/0315918 A1* 12/2012 Kadous ................ H04W 64/00
                                                      455/456.1
2014/0315536 A1    10/2014 Chow et al.
2018/0332503 A1    11/2018 Olson

* cited by examiner

METHOD OF SCHEDULING DOWNLOADS FOR COMMUNICATION DEVICES CONNECTED TO A DOWNLOAD SERVER THROUGH A COMMON ACCESS POINT

BACKGROUND OF THE INVENTION

Communication devices are now in common use by users, and they provide users with instant access to increasingly valuable information and resources. Users sometimes need to download large files, for example, to update the device firmware or to store a video file for offline viewing on their communication devices. While improvement in radio technologies in recent years allows users to download large data files on their communication devices within a few seconds, it is still problematic for enterprises that often have hundreds, if not, thousands of user devices that may attempt to download large data files while being connected through the same radio network infrastructure such as an access point. Enterprise data servers often push out large data files such as firmware updates to the user devices at the same time. In such situations, user devices located in proximity to each other may connect to the same access point and may further attempt to concurrently download large files while being connected through the same access point. However, when multiple user devices associated with the same access point attempt to download large data files, the download speed is invariably reduced due to limitations of bandwidth at the access point. The speed reduction may be minimal when few devices share the same access point, but the download speed eventually gets reduced when more devices connect through the same access point and compete for the bandwidth at the access point, thereby causing bandwidth overloading at the access point.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
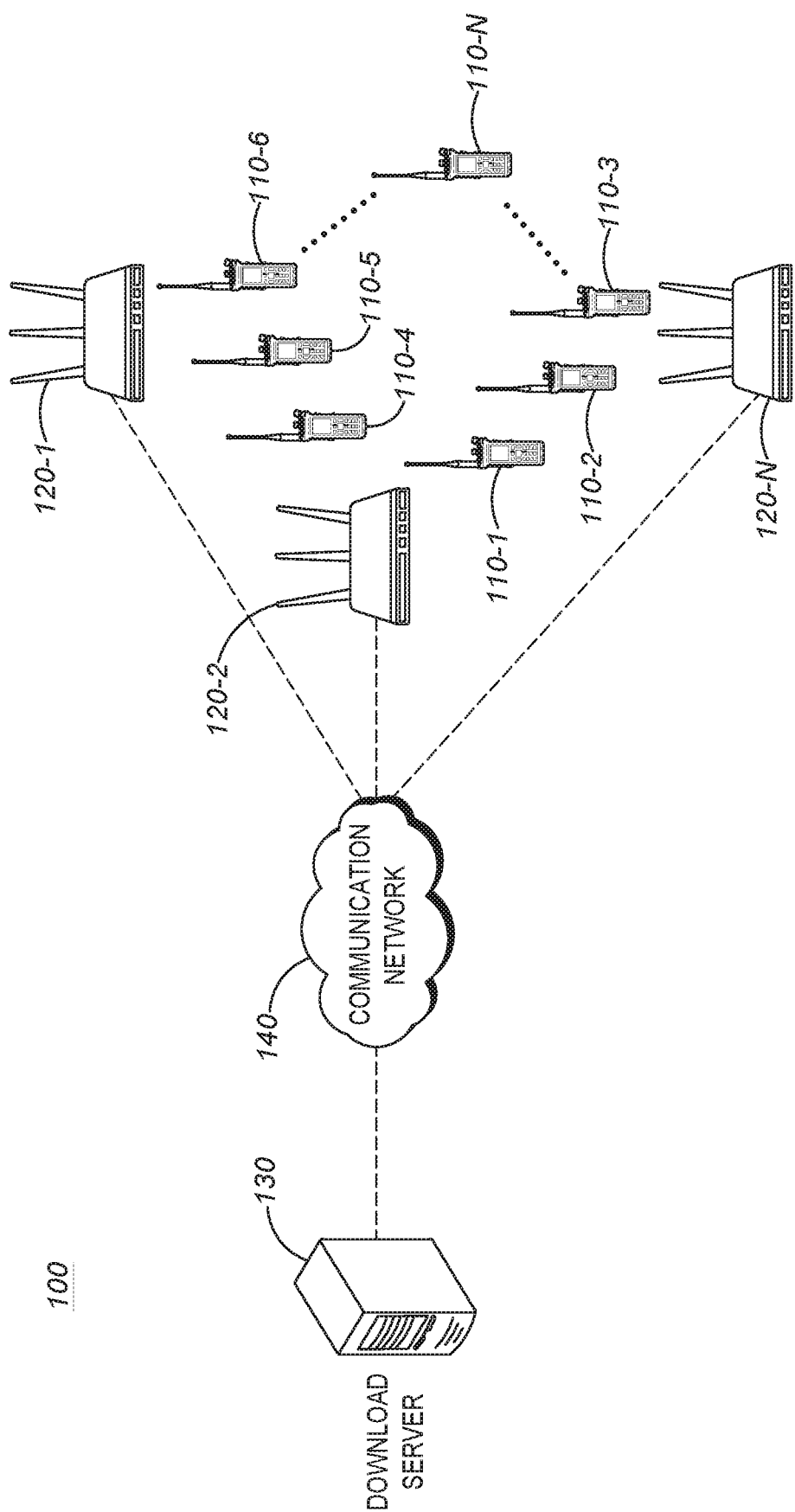
FIG. 1 is a block diagram of a communication system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method of scheduling downloads for communication devices connected to a download server through an access point. The method includes: maintaining, at the download server, at least one access point record, wherein each access point record is linked to a unique access point identifier of a respective access point and includes a communication devices list to identify communication devices connected to the download server through the respective access point; receiving, at the download server, a download request from a first communication device, the download request including a unique access point identifier of a first access point through which the first communication device is connected to the download server; identifying, at the download server, an access point record of the at least one access point record that is linked to the unique access point identifier of the first access point through which the first communication device is connected to the download server; updating, at the download server, the identified access point record to include the first communication device in the communication devices list included in the identified access point record; determining, at the download server, whether a count of communication devices included in the communication devices list of the identified access point is greater than a predetermined count threshold; and responsive to determining that the count of communication devices included in the communication devices list is greater than the predetermined count threshold, delaying, at the download server, an execution of a download service corresponding to the download request received from the first communication device.

Another embodiment provides a download server including a memory that maintains at least one access point record, a network interface, and an electronic processor communicatively coupled to the memory and network interface. Each access point record maintained at the memory is linked to a unique access point identifier of a respective access point and includes a communication devices list to identify communication devices connected to the download server through the respective access point. The electronic processor is configured to: receive, via the network interface, a download request from a first communication device, the download request including a unique access point identifier of a first access point through which the first communication device is connected to the download server; identify an access point record of the at least one access point record that is linked to the unique access point identifier of the first access point through which the first communication device is connected to the download server; update the identified access point record to include the first communication device in the communication devices list included in the identified access point record; determine whether a count of communication devices included in the communication devices list of the identified access point is greater than a predetermined count threshold; and delay an execution of a download service corresponding to the download request received from the first communication device when the count of communication devices included in the communication devices list is greater than the predetermined count threshold.

Referring now to the drawings, and in particular FIG. 1, an example implementation of communication system 100 is shown including a plurality of communication devices 110-1, 110-2, . . . 110-N and a plurality of wireless access points 120-1, 120-2, . . . 120-N. The plurality of communication devices 110-1 through 110-N can be interchangeably referred to, collectively, as communication devices or devices 110, and generically as a communication device or device 110. The plurality of wireless access points 120-1 through 120-N can be interchangeably referred to, collectively, as wireless access points or access points 120, and generically as a wireless access point or access point 120. Although FIG. 1 only shows few communication devices 110 and wireless access points 120, the communication system 100 may include any number of wireless access points 120 each serving any number of communication devices 110. The communication device 110 may be operated by users and include both mobile and fixed communication devices. In one embodiment, the communication device 110 may include devices that are operated by public-safety users such as a battery-powered portable radio used for narrowband and/or broadband direct-mode or infrastructure communications, a battery-powered radio speaker microphone (RSM) video capture device, a body worn camera, a laptop having an integrated video camera and used for data applications such as incident support applications, smart glasses which may be virtual reality, augmented reality, or mixed reality glasses, wearable communication devices, mobile phones, and vehicular radios. Each communication device 110 may include one or more wireless communication interfaces for connecting with a wireless access point 120 via an air interface link in accordance with one or more air-interface protocols such as Wi-Fi, as long as the communication device 110 and the wireless access point 120 are within mutual transmission range of one another.

The wireless access point 120 is a fixed or mobile network device that provides wireless connection services (e.g., internet services) for one or more client devices (e.g., communication devices 110) that are located within a coverage area (referred to as hotspot areas) of the wireless access point 120. In accordance with some embodiments, the wireless access points 120 are implemented in accordance with IEEE (Institute of Electrical and Electronics Engineers) 802.11 wireless protocol. For example, the wireless access point 120 is a Wi-Fi access point operating in accordance with the IEEE 802.11 wireless protocol. Each wireless access point 120 is configured to transmit a beacon communication (e.g., IEEE 802.11 periodic beacon) to advertise its services to client devices such as communication devices 110 that are located within the coverage area of the access point 120. This enables devices to select a target wireless access point, for example, based on the received signal strength, to connect to services advertised by the target wireless access point. In accordance with embodiments, the beacon communications broadcasted by the wireless access points 120 include, among service information, a unique access point identifier that is uniquely associated with the respective wireless access points 120. The unique access point identifier may include a medium access control (MAC) address of the wireless access point 120, a network identifier such as a network name, a service set identifier (SSID), a basic service set identifier (BSSID), an extended service set identifier (ESSID), Internet Protocol (IP) address, another unique identifier, and any combination thereof.

As shown in FIG. 1, the communication system 100 further includes a download server 130 that is operated in accordance with the embodiments described herein to schedule downloads for communication devices 110 that are connected to the download server through a common wireless access point 120. In accordance with embodiments, as each communication device (e.g., communication devices 110-1, 110-2, . . . 110-N) connects to the download server 130 to request to download data from the download server 130, the download server 130 schedules download for the communication devices 110 on the basis of a count of other communication devices that are connected to the downloads server 130 through the same access point as the requesting communication device. Communication devices 110 may also include devices not shown in FIG. 1. For example, new communication devices 110-N+1, 110-N+2, . . . etc., may join the system 100 by connecting to the download server 130 through one of the access points 120 shown in FIG. 1. The communication devices 110, wireless access point 120, and download server 130 are connected via one or more communication networks 140 that include a combination of wired and wireless network, operated for example, by a cellular or internet service provider, or any public safety network operated by a government organization. The communication network 140 may include network components such as a base station, repeaters, and routers (not shown) that can receive information (data, voice, video, etc.) in a signal from the communication devices 110, access points 120, and download server 130.

In accordance with some embodiments, when a download server 130 receives a download request from a communication device 110, the download server 130 updates an access point record corresponding to an access point 120 through which the communication device 110 sending the download request is connected to the download server 130. Since a communication device 110 often switches its association from one access point 120 to another access point 120, for example, based on the relative signal strength received at the communication device 110 from the respective access points, the communication device 110 is enabled to include, in the download request transmitted to the download server 130, a unique access point identifier of a currently serving access point (i.e., an access point through which the communication device 110 is currently connected to the download server 130). The inclusion of unique access point identifier each time a communication device 110 transmits a download request to the download server 130 ensures that the download server 130 has an accurate record of a particular access point 120 through which the communication device 110 is connected to the download server 130 for downloading data. In accordance with some embodiments, the download server 130 may maintain multiple access point records i.e., one access point record for each access point 120 that currently connects the communication devices 110 to the download server 130 via the communication network 140 for providing download services.

In response to the download request received from the communication device 110, the download server 130 schedules a download for the communication device 110 either by immediately executing a download service or by delaying an execution of the download service. The determination of whether to immediately execute the download service or delaying an execution of the download service is performed by the download server 130 based on a count of communication devices 110 that are currently connected through a common access point 120 to the download server 130. While embodiments described herein can be applied for scheduling download of data of any data size from the download server 130, the embodiments described herein can be advantageously implemented to prevent bandwidth overloading at access points 120 when multiple communication devices 110 connected to a common access point 120 are concurrently downloading large files of data such as a firmware update, for example, with data sizes larger than one gigabyte of data. The embodiments of the present disclosure can also be used to schedule downloads for other large files such as video, public safety incident records, evidentiary data, application updates, etc.

Figure 2:
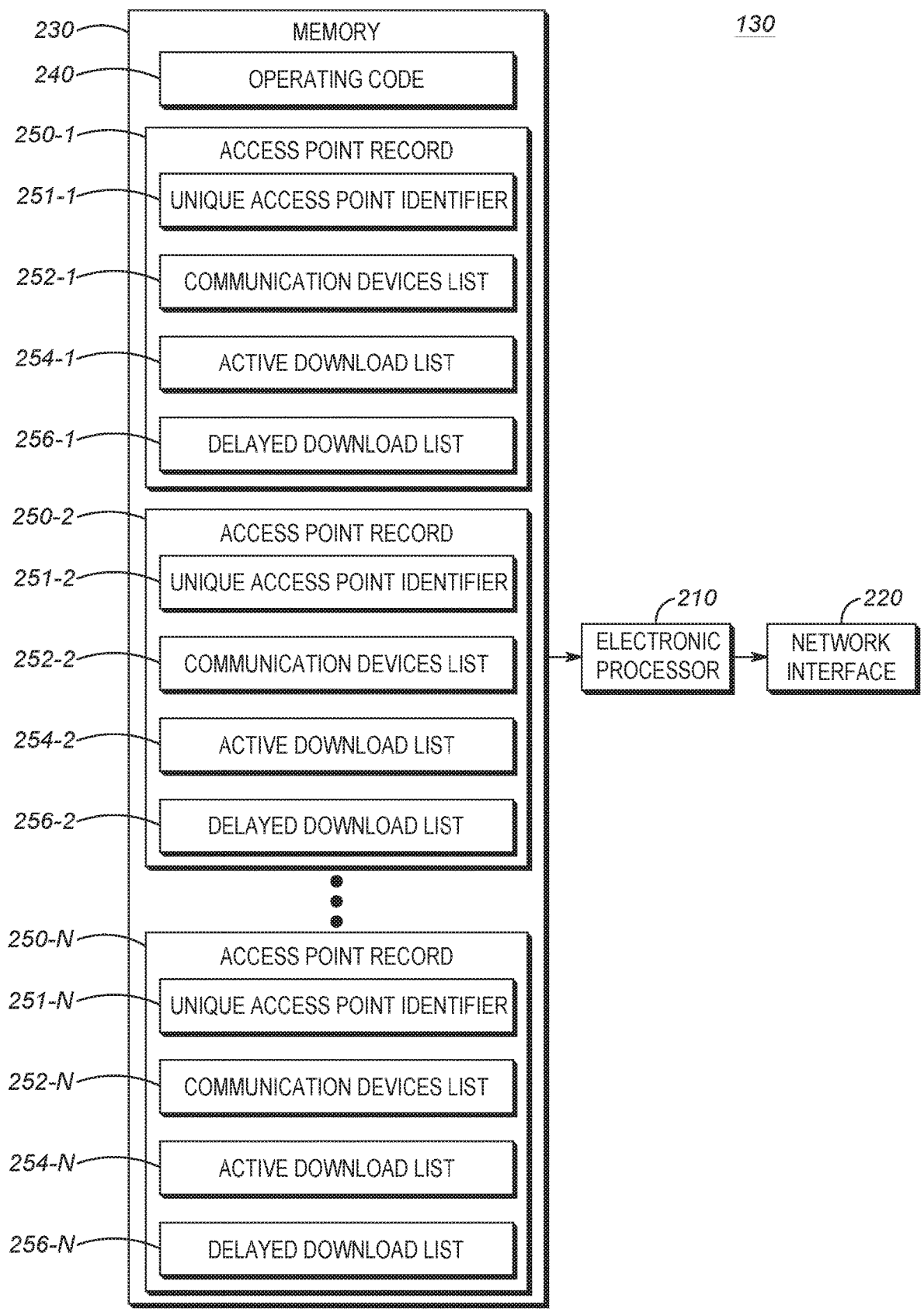
FIG. 2 is a block diagram of a download server, in accordance with some embodiments.

FIG. 2 is an example functional block diagram of a download server operating within the communication system 100 in accordance with some embodiments. While FIG. 2 represents a download server 130 described above with respect to FIG. 1, depending on the type of the download server 130, the download server 130 may include fewer or additional components in configurations different from that illustrated in FIG. 2. In some embodiments, the functionality and components associated with the download server 130 are implemented in a distributed manner in multiple servers employed in the system 100.

As shown in FIG. 2, the download server 130 includes an electronic processor 210, for example, a microprocessor, a logic circuit, an application-specific integrated circuit (ASIC), a field-programmable gate array (FPGA), or another electronic device. The electronic processor 210 may include input and output interfaces and be electrically connected to a network interface 220 and a memory 230. The network interface 220 sends and receives data to and from other network entities in the communication system 100. The network interface 220 may include a transceiver for wirelessly communicating with other network entities in the system 100. Alternatively, or in addition, the network interface 220 may include a connector or port for receiving a wired connection, such as an Ethernet cable. The electronic processor 210 may generate electrical signals and may communicate information relating to the electrical signals through the network interface 220, such as for receipt by the communication device 110 through the respectively associated wireless access points 120.

The memory 230 includes read-only memory (ROM), random-access memory (RAM), other non-transitory computer-readable media, or a combination thereof. For example, the memory 230 may comprise a hard disk drive (HDD), an optical disk drive (ODD) such as a compact disk (CD) drive or digital versatile disc (DVD) drive, a solid-state drive (SSD), a tape drive, a flash memory drive, or a tape drive, to name a few. The memory 230 may store operating code 240 that, when executed by the electronic processor 210, performs one or more of the blocks set forth in FIG. 3 and the accompanying text(s).

In accordance with embodiments, the download server 130 maintains, at the memory 230, an access point record 250 for each access point 120 through which one or more communication devices 110 are connected to the download server 130 for downloading data from the download server 130. Each access point record 250 further includes: a unique access point identifier 251 that uniquely identifies the respective access point 120; communication devices list 252 to identify one or more communication devices 110 that are connected through the respective access point 120; an active download list 254 to identify communication devices 110 from the communication devices list 252 that are actively downloading from the download server 130 through the respective access point 120; and a delayed download list 256 to identify communication devices 110 from the communication devices list 252 that are waiting to download from the download server 130 as a result of the download server 130 delaying an execution of a download service corresponding to the download request received from the respective communication devices 110. For example, the access point record 250-1 that is stored corresponding to the access point 120-1 shown in FIG. 1 includes: a unique access point identifier 251-1 of the access point 120-1; a communication devices list 252-1 to identify communication devices 110 connected to the download server 130 through the access point 120-1; an active download list 254-1 to identify communication devices 110 from the communication devices list 252-1 that are actively downloading from the download server 130 through the access point 120-1; and a delayed download list 256-1 to identify communication devices 110 from the communication devices list 252-1 that are waiting to download from the download server 130 through the access point 120-1. Access point records 250-2 . . . 250-$n$ stored at the memory 230 include similar data corresponding to the access points 120-2 . . . 120-$n$, respectively. The access point record 250 and the corresponding lists 252, 254, 256 are implemented using a suitable data structure.

Figure 3:
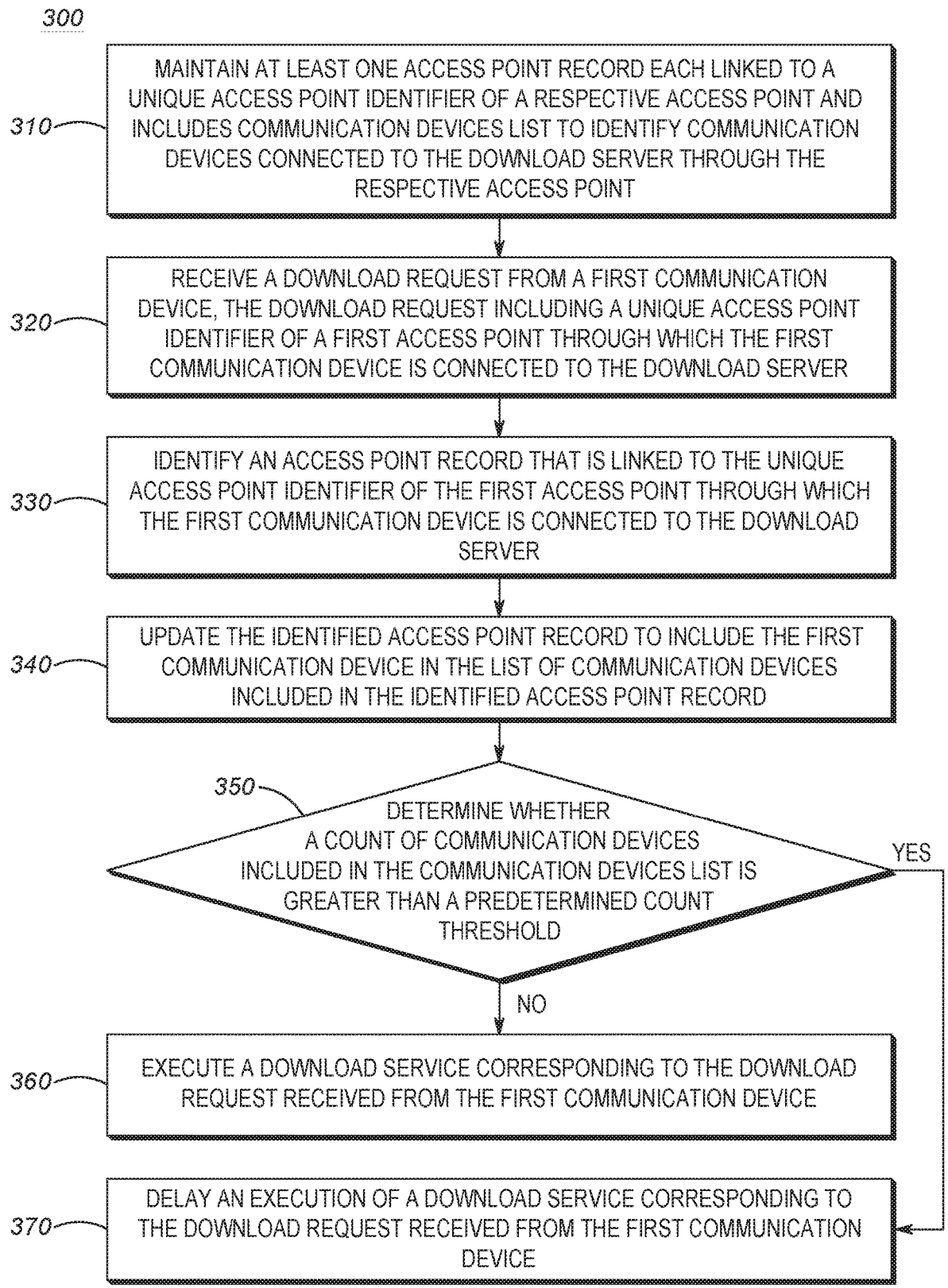
FIG. 3 illustrates a flow chart of a method of scheduling downloads for communication devices connected to a download server through an access point in accordance with some embodiments.

FIG. 3 illustrates a flow chart diagram of a process 300 of scheduling downloads for communication devices 110 connected to a download server through an access point. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. The process shown in FIG. 3 can be performed by one or more components, for example, electronic processor 210 of the download server 130, and will be described with reference to the functions and components of the system 100.

Process 300 begins at block 310 when the download server 130 maintains at least one access point record 250 (e.g., access point record 250-1, 250-2, . . . 250-$n$ shown in FIG. 2). Each access point record 250 is linked to a unique access point identifier of a respective access point 120 and further includes a communication devices list 252 to identify communication devices 110 connected to the download server 130 through the respective access point 120. In accordance with some embodiments, the download server 130 may maintain multiple access point records 250 when different groups of communication devices 110 are connected to the download server 130 through different access points 120 for downloading data from the download server 130. When multiple access point records 250 are maintained at the download server 130, at any given point in time, each communication device 110 that is identified as connected to the download server 130 is included in only one communication devices list 252 corresponding to a particular access point 120 with which the communication device 110 is currently associated. If the communication device 110 switches its association to a different access point 120, the communication devices list 252 of the respective access points 120 is updated. For example, when a communication device 110-1 switches its association from an access point 120-1 to an access point 120-2, then the download server 130 updates a communication devices list 252-1 corresponding to the access point 120-1 to remove the communication device 110-1 from the list 252-1 and further updates a communication devices list 252-2 corresponding to the access point 120-2 to include the communication device 110-1 in the list 252-2. The download server 130 updates the communication devices list 252 of an access point record 250 each time a download request indicating a change in the unique access point identifier is received from a particular communication device 110.

At block 320, the download server 130 receives a download request from a communication device 110 (referred herein as a "first communication device"). The download request includes a unique device identifier (e.g., MAC address) that uniquely identifies the first communication device 110 and a unique access point identifier that uniquely identifies an access point (referred herein as a "first access point") through which the first communication device 110 is connected to the download server 130. In one embodiment, the download request includes only the unique access point identifier of the access point 120 with which the communication device 110 is associated. In other embodiments, the download request may additionally include information about the communication device 110 and corresponding user. For example, the information may include one or more of model number, serial number, current firmware version, and user identifier that are associated with the communication device 110. In one embodiment, the download request may correspond to a periodic check-in request transmitted from the first communication device 110 to the download server 130 to check whether particular download data such as a firmware upgrade is available for download from the download server 130. In accordance with some embodiments, while the download server 130 is configured to schedule downloads for communication devices, the actual data or files corresponding to the download request such as the firmware update may be stored either at the download server 130 or at another remote server controlled by the download server 130. In one embodiment, the identification of the unique access point identifier in a signal corresponding to the download request received from the first communication device 110 indicates to the download server 130 that the first communication device 110 is requesting to download data from the download server 130 through the first access point 120 identified by the unique access point identifier.

In any case, when the download server 130 receives a download request including a unique access point identifier of the first access point 120 through which the first communication device 110 is connected to the download server 130, the download server 130 proceeds to block 330 to identify a particular access point record, for example, from access point records 250-1, 250-2 . . . 250-n, that is linked to the unique access identifier of the first access point 120 through which the first communication device 110 is connected to the download server 130. For example, when the first access point 120 corresponds to an access point 120-1 shown in FIG. 1, the download server 130 may identify the access point record 250-1 that is linked to a unique access identifier of the access point 120-1.

Next, at block 340, the download server 130 updates the identified access point record 250 to include the first communication device 110 in the communication devices list 252 included in the identified access point record 250. For example, when the identified access point record 250 corresponds to an access point record 250-1, the download server 130 includes the unique device identifier of the first communication device 110 in the communication devices list 252-1 included in the access point record 250-1. In other words, the communication devices list 252-1 identifies all communication devices 110 including the newly added first communication device 110 that are connected through a common access point i.e., access point 120-1. In one embodiment, prior to and/or after updating the identified access point record 250 to include the first communication device 110 in the communication devices list 252 of the identified access point record 250, the download server 130 further determines whether the first communication device 110 (i.e., the unique device identifier of the first communication device 110) was previously included (for example, in response to a previous download request received from the communication device 110) in a communication devices list 252 associated with other access point records 250 maintained by the download server 130. For example, if the download server 130 determines that the first communication device 110 is already included in a communication devices list 252-2 of an access point record 250-2 corresponding to a second access point 120-2, the download server 130 also updates the communication devices list 252-2 of the access point record 250-2 to remove the first communication device 110 from the list of communication devices 110 connected to the second access point 120-2.

After updating the identified access point record 250 associated with the first access point 120 to include the first communication device 110 in the communication devices list 252, the download server 130 proceeds to block 350 to determine whether a count of communication devices 110 included in the communication devices list 252 of the identified access point record 250 is greater than a predetermined count threshold 'X'. The predetermined count threshold 'X' may be used-defined or system-defined, and further corresponds to a maximum number of communication devices 110 that is able to concurrently download from the download server 130 through a common access point 120 while avoiding bandwidth overloading at the common access point. The predetermined count threshold 'X' may be different for different access points depending on bandwidth configured at the respective access points. In some embodiments, the predetermined count threshold 'X' may also be determined as a function of a count of other communication devices that may be connected through a particular access point (but not to the download server 130) for purposes other than downloading data from the download server 130. For example, in addition to communication devices 110 that are connected to the download server 130 through a particular access point for downloading data from the download server 130, there may be other communication devices 110 that are connected to the access point 120 to access other services advertised by the access point 120. In this case, the number of other communication devices that may be connected (e.g., an estimate of number of communication devices that may be served by the access point at a given point in time based on historical pattern) is also factored in when the predetermined count threshold 'X' is set. In one embodiment, the predetermined count threshold 'X' is heuristically determined by measuring the average download time for increasing values of 'X' until the average download time is approximately 'n' times (e.g., twice) the average download time for 'X'=1, where 'n' is any predetermined value.

At block 360, when the download server 130 determines that the count of communication devices including the first communication device 110 included in the communication devices list 252 of the identified access point record 250 is not greater than the predetermined count threshold, the download server 130 executes a download service corresponding to the download request received from the first communication device 110. In other words, the download server 130 in this case determines that the download for the first communication device 110 can be immediately scheduled, i.e., without "a delay period," while being able to avoid bandwidth overloading at the first access point 120 through which the first communication device 110 is connected to the download server 130. In one embodiment, the download server 130 immediately executes the download service by including the first communication device 110 in an active download list 254 of the identified access point record 250 that identifies communication devices 110 from the communication devices list 252 that are actively downloading from the download server 130. Additionally, or alternatively, the download server 130 immediately executes the download service, for example, by transmitting a response to the first communication device 110 in response to the download request to allow the first communication device 110 to download from the download server 130 through the first access point. In one embodiment, the download server 130 may execute a download service corresponding to a download request received from the first communication device by providing the first communication device with access to download data (e.g., firmware update files) that are stored at the download server 130 or at a remote server controlled by the download server 130.

On the other hand, at block 370, when it is determined that the count of communication devices including the first communication device 110 included in the communication devices list 252 of the identified access point record 250 is greater than the predetermined count threshold, the download server 130 delays execution of a download service corresponding to the download request received from the first communication device. In other words, in this case, the download server 130 determines that immediately scheduling a download for the first communication device would cause bandwidth overloading at the first access point 120 through which the first communication device 110 is connected to the download server 130, and accordingly delays execution of the download service. In one embodiment, the download server 130 delays execution of the download service for the first communication device 110 by including the first communication device 110 in a delayed download list 256 of the identified access point record 250. The delayed download list 256 identifies communication devices 110 from the communication device list 110 that are not actively downloading or in other words communication devices 110 that are waiting to download after transmitting the download request to the download server 130. In accordance with some embodiments, the download server 130 further transmits a response to the first communication device 110 indicating that the execution of the download service in response to the download request is being delayed. In one embodiment, the download server 130 delays execution of the download service by not updating access rights corresponding to the data for which the download request is received from the first communication device until the count of communication devices 110 included in the communication devices list 252 is not greater than the predetermined count threshold.

In one embodiment, the download server 130 delays the execution of the download service at least for a time period (referred herein as "a delay period") between receiving the download request and detecting that at least one of the communication devices 110 included in the active download list 254 of the identified access point record 250 has completed downloading from the download server 130. For example, if 't1' corresponds to a time at which the download request was received from the first communication device 110 and 't2' corresponds to a time at which the download server 130 has detected that at least one of the communication devices 110 included in the active download list 254 has completed its download, then the download server 130 delays the execution of the download service at least for a delay period equal to 't2−t1'. In another embodiment, the download server 130 delays the execution of the download service during a delay period between receiving the download request and interrupting a download associated with at least one of the communication devices 110 included in the active download list 254 that has an assigned download priority lower than an assigned download priority of the first communication device 110. For example, if 't1' corresponds to a time at which the download request was received from the first communication device 110 and 't3' corresponds to a time at which the download associated with at least one of the communication devices 110 included in the active download list 254 is interrupted, then the download server 130 delays the execution of the download service at least for a delay period equal to 't3−t1' In this embodiment, the download server 130 may assign a download priority for each communication device 110 included in the active download list 254 based on one or more parameters including: type of data to be downloaded, role of a user associated with the communication device 110, and an urgency indicator included in the download request indicating permission to download with high priority, and the like.

In the above embodiments, the download server 130 begins to execute the download service corresponding to the download request received from the first communication device 110 either when at least one of the communication devices 110 included in the active download list 254 has completed downloading from the download server 130 or when a download associated with at least one of the communication devices 110 included in the active download list 254 is interrupted. In accordance with embodiments, the delay period corresponds to a period during which the first communication device 110 is still waiting to download from the download server 130 after transmitting the download request. The delay period ends with the download server 130 executing the download server 130 by removing the first communication device 110 from the delayed download list 256 and placing the first communication device 110 in the active download list 254 to enable the first communication device 110 to download from the download server 130. In accordance with some embodiments, the download server 130 executes, after the delay period, the download service in response to the download request received from the first communication device by (i) transmitting a response to the download request instructing the first communication device 110 to begin downloading from the download server 130 or (ii) transferring download data corresponding to the download request from the download server 130 to the first communication device.

In accordance with some embodiments, when the first communication device 110 has completed downloading from the download server 130 or when the download associated with the first communication device 110 is interrupted (e.g., due to a download request received from another communication device connected to the download server 130 through the first access point with an assigned download priority level that is higher than the assigned download priority level of the first communication device 110), the first communication device is removed from the active download list 254. The first communication device 110 may be additionally placed in the delayed download list 256 in case the download was interrupted for the first communication device 110. In some embodiments, the first communication device 110 is also removed from the communication devices list 252 when the download server 110 has serviced all download requests received from the first communication device 110 and the first communication device 110 has successfully completed downloading from the download server 130 or when the first communication device 110 has terminated its connection with the download server 130 or when the first communication device is no longer connected to the download server 130 through the first access point 120.

In accordance with some embodiments, when the download server 130 receives a second download request from the first communication device 110 (whether or not a download associated with the previous download request was successfully completed) including a second unique access identifier of a second access point 120 (e.g., access point 120-2 that is different from access point 120-1) through which the first communication device 110 is connected to the download server 130, the download server 130 determines that the first communication device 110 is previously included in the communication devices list 252 (e.g., 252-1) in the access point record 250 (e.g., access point record 250-1) associated with the first access point (e.g., access point 120-1) and responsively removes the first communication device 110 from the communication devices list 252 (e.g., communication devices list 252-1) included in the access point record 250 (e.g., access point record 250-1) associated with the first access point 120 (e.g., access point 120-1). In this case, the download server 130 further identifies an access point record 250 (e.g., access point record 250-2) that is linked to the second unique access point identifier of the second access point 120 (e.g., access point 120-1), and updates the access point record 250 (e.g., access point record 250-2) associated with the second access point 120 (e.g., access point 120-2) to include the first communication device 110 in the communication devices list 252 (e.g., communication devices list 252-2) included in the access point record 250 (e.g., access point record 250-2) associated with the second access point 120 (e.g., access point 120-2). In accordance with embodiments, the download server 130 repeats the functionality described in process 300 and the accompanying text for each download request received from any communication device 110 connected to any access point 120 in the system 100.

While process 300 is primarily described for scheduling download for communication devices 110 connecting to the download server 130 through a particular access point, the download server 130 concurrently executes the process 300 for download requests received from any number of communication devices that are connected to the download server 130 through the same or different access point 120.

Figure 4:
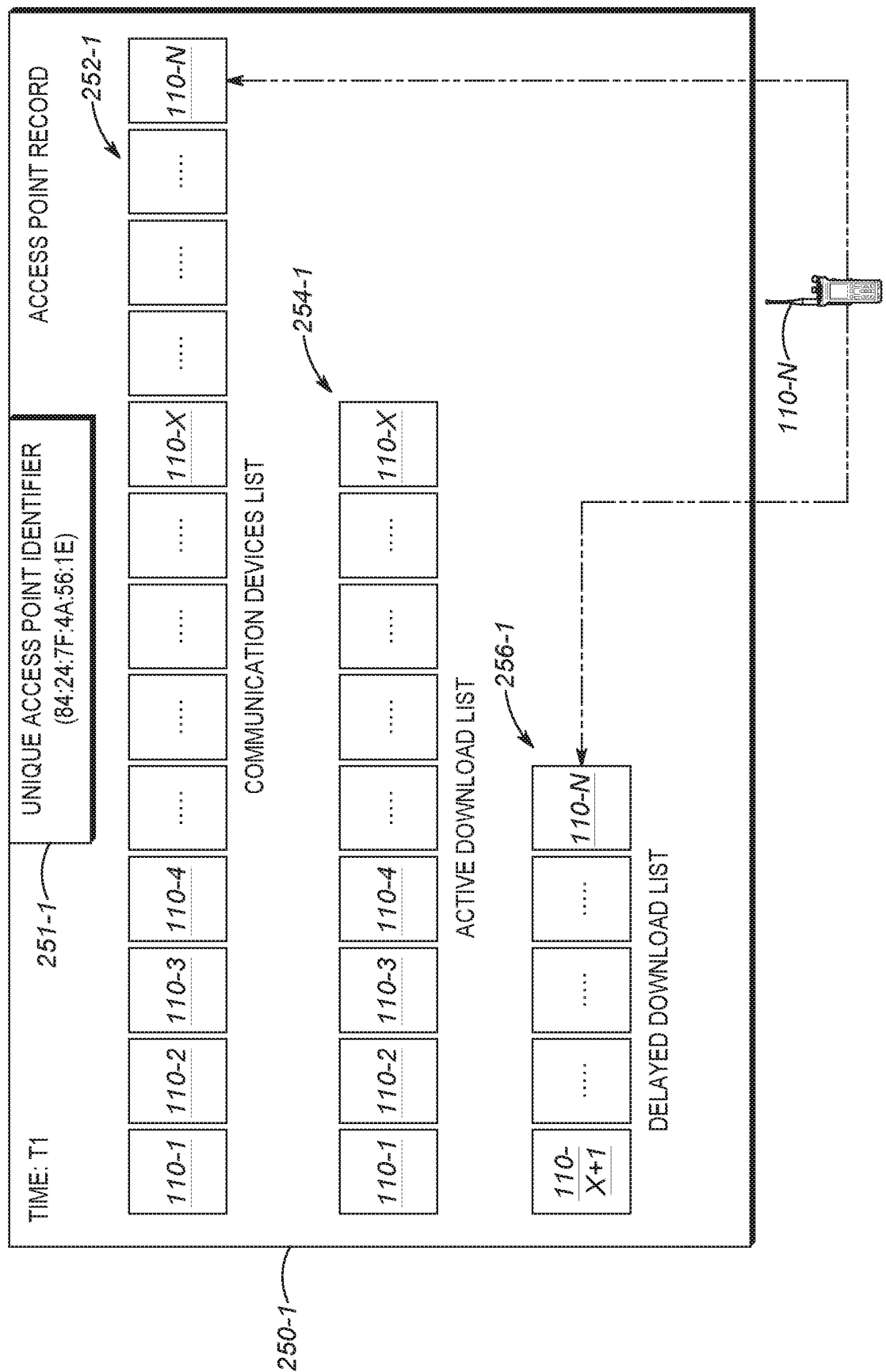
FIGS. 4-7 illustrate a logical data structure of an access point record maintained by the download server at different time periods.

FIGS. 4-7 illustrate a logical structure of an example access point record 250-1 maintained by the download server 130. FIG. 4 provides a snapshot of communication devices list 252-1, active download list 254-2, and delayed download list 256-2 that are included in the access point record 250-1 corresponding to the access point 120-1 at time 'T1'. As shown in FIG. 4, the access point record 250-1 is linked to a unique access point identifier 251-1 of the access point 120-1. The unique access point identifier 251-1 may correspond to a MAC address (e.g., 84:24:7F:4A:56:1E) of the access point 120-1. In accordance with some embodiments, the communication device list 252-1, active download list 254-1 and delayed download list 256-1 are implemented using a suitable data structure. The communication devices list 252-1 identifies communication devices 110-1, 110-2, . . . 110-X, . . . 110-N that are connected through the common access point 120-1. For purposes of illustration, reference numbers such as 110-1, 110-2, . . . etc., are shown to indicate the respective communication devices 110 that are included in the communication device list 252-1, active download list 254-1, and delayed download list 256-1. In an actual implementation of the embodiments, the download server 130 may include a unique device identifier such as a MAC address of the respective communication devices to identify the respective communication devices included in the communication device list 252-1, active download list 254-1, and delayed download list 256-1.

In FIG. 4, a communication device 110-N is further shown to illustrate that the communication device 110-N is the most recent device to send a download request to the download server 130. In this case, since the received download request includes the unique access point identifier 251-1 of the access point 120-1 to indicate that the communication device 110-N is connected to the download server 130 through the access point 120-1, the download server 130 updates the communication devices list 252-1 of the access point record 250-1 associated with the access point 120-1 to include the communication device 110-N. In accordance with the process 300 described with reference to FIG. 3, the download server 130 determines whether a count of communication devices 110-1, 110-2, . . . 110-N included in the communication devices list 252-1 is greater than a predetermined count threshold 'X'. When count of communication devices 110-1, 110-2, . . . 110-N is greater than 'X', the download server 130 delays executing a download service corresponding to the download request received from the communication device 110-N and further places the communication device 110-N in a delayed download list 256-1 that identifies communication devices 110-X+1, . . . etc., from the communication devices list 252-1 that are waiting to download data from the download server 130.

FIG. 4 further shows an active download list 254-1 that identifies communication devices 110-1, 110-2, . . . 110-X from the communication devices list 252-1 that are actively downloading from the download server 130. The active download list 254-1 is configured to allow a maximum number of communication devices that is allowed by the predetermined count threshold 'X'. In accordance with some embodiments, the download server 130 may place a communication device (e.g., communication device 110-1) directly (i.e., without placing the communication device first in the delayed download list 256-1) in the active download list 254-1 when the count of communication devices 110 including the communication device 110-1 in the communication devices list 252-1 is not greater than the predetermined count threshold 'X'. In other words, in this case, download server 130 determines to immediately execute a download service (i.e., without delaying execution of the download service) corresponding to the download request received from the communication device 110-1. Alternatively, the download server 130 may first place a communication device (e.g., communication device 110-N) in the delayed download list 256-1 when the count of communication devices 110 including the communication device 110-N in the communication devices list 252-1 is greater than the predetermined count threshold 'X'.

In one embodiment, the communication device 110-N would be placed in the active download list 254-1 only when one or more communication devices 110-1, 110-2, . . . 110-X currently included in the active download list has completed the download corresponding to their download requests to the download server. In other words, when a communication device 110 included in the active download list 254-1 has completed the download, the active download list 254-1 is updated to remove the communication device 110. When a communication device 110 is removed from the active download list 254-1, the download server 130 selects a communication device included in the delayed download list 256-1 and executes a download service for the download request received from the communication device 110 by placing the communication device 110 in the active download list, which in turn enables the communication device 110 to start downloading from the download server 130. So, an execution of a download service corresponding to the download request received from the communication device 110-N is delayed for at least a time period (referred herein as "delay period") between a first time point at which the download server places the communication device 110-N in the delayed download list 256-1 in response to receiving the download request and a second time point at which the communication device was placed in the active download list 254-1.

In one embodiment, each communication device 110 included in the delayed download list 256-1 is assigned a priority level that determines the order in which the communication device 110 would be removed from the delayed download list 256-1 and further placed in the active download list 254-1 when one or more communication devices 110 in the active download list 254-1 complete their downloads. For example, as shown in FIG. 4, the communication device 110-X+1 may have a higher priority level than the communication device 110-N because the download request from the communication device 110-X+1 was received earlier than the download request from the communication device 110-N. In this embodiment, the delayed download list may be implemented using a first-in-first-out (FIFO) queue structure, such that, a communication device (in this case, communication device 110-X+1 placed in the left most queue slot) that sent the least recent download request is given priority over another communication device (e.g., communication device 110-N which sent the most recent download request and further accordingly placed in the right most queue slot) to replace the communication device (e.g., communication device 110-1) that has been removed from the active download list after it has completed its download.

In another embodiment, each communication device 110-X+1, . . . 110-N included in the delayed download list 256-1 is assigned a priority level based on an urgency indicator included in the download request. In this embodiment, the communication device 110-N would be placed in the active download list 254-1 only when at least one communication device included in the active download list 254-1 has an assigned priority level that is lower than the communication device 110-N and further when all other communication devices (e.g., communication devices 110-X+1, . . . etc., that sent download requests prior to the communication device 110-N) currently included in the active download list 254-1 has an assigned priority level that is lower than the communication device 110-N. In this case, the download server 130 interrupts a download associated with one of the communication devices 110-1, 110-2, . . . 110-X having a low priority level in the active download list 254-1 to execute a download service corresponding to the download request received from the communication device 110-N. Execution of the download service places the communication device 110-N in the active download list 254-1, such that, the communication device 110-N can begin downloading from the download server 130. So, in this case, execution of the download service corresponding to the download request received from the communication device 110-N is delayed for at least a time period (referred herein as "delay period") between a first time point at which the download server 130 places the communication device 110-N in the delayed download list 256-1 in response to receiving the download request and a second time point at which a download associated with a communication device 110 that is currently included in the active download list 254-1 is interrupted in order to place the communication device 110-N in the active download list 254-1.

Figure 5:
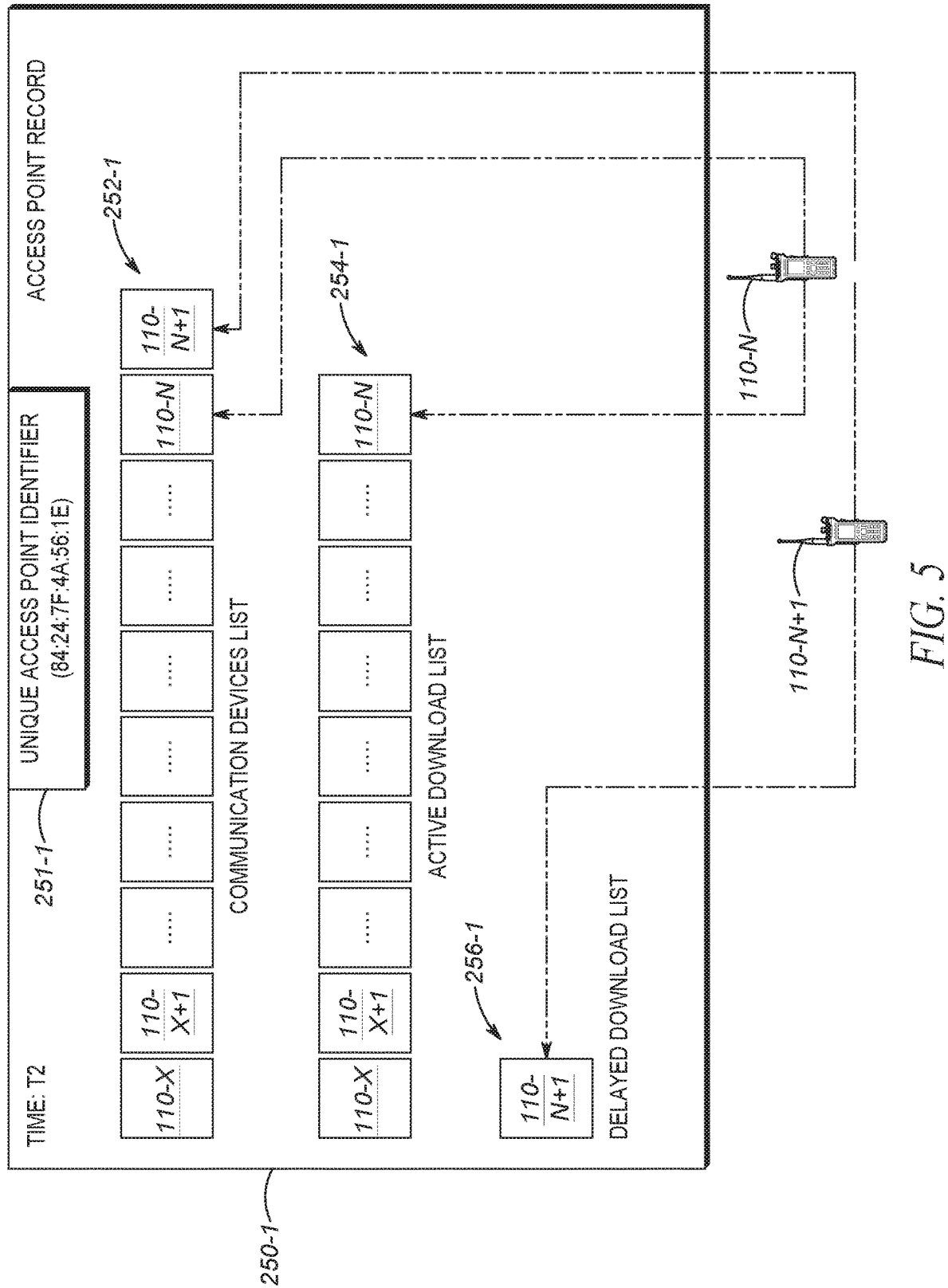

FIG. 5 provides a snapshot of communication devices list 252-1, active download list 254-2, and delayed download list 256-2 that are included in the access point record 250-1 corresponding to the access point 120-1 at time 'T2'. In FIG. 5, a communication device 110-N+1 is further shown to illustrate that the communication device 110-N+1 is the most recent device to send a download request to the download server 130. In this case, since the received download request includes the unique access point identifier 251-1 of the access point 120-1 to indicate that the communication device 110-N is connected to the download server 130 through the access point 120-1, the download server 130 updates the communication devices list 252-1 of the access point record 250-1 associated with the access point 120-1 to include the communication device 110-N+1. In accordance with the process 300 described with reference to FIG. 3, the download server 130 determines whether a count of communication devices 110-X, 110-X+1, . . . 110-N+1 currently included in the communication devices list 252-1 is greater than a predetermined count threshold 'X'. When count of communication devices 110-X, 110-X+1, . . . 110-N+1 is greater than 'X', the download server 130 delays executing a download service corresponding to the download request received from the communication device 110-N+1 and further places the communication device 110-N in the delayed download list 256-1. In the example shown in FIG. 5, the delayed download list 256-1 does not include communication devices other than the communication device 110-N+1 at time 'T2'. FIG. 5 also shows that communication devices 110-1, . . . 110-X-1 are removed from active download list 254-1. This may be either due to communication devices 110-1, . . . 110-X-1 successfully completing their download from the download server 130 between time 'T1' and time 'T2' or due to terminating their connection with the download server 130 or due to switching their connection to the download server 130 through a different access point 120 between time 'T1' and time 'T2'.

Figure 6:
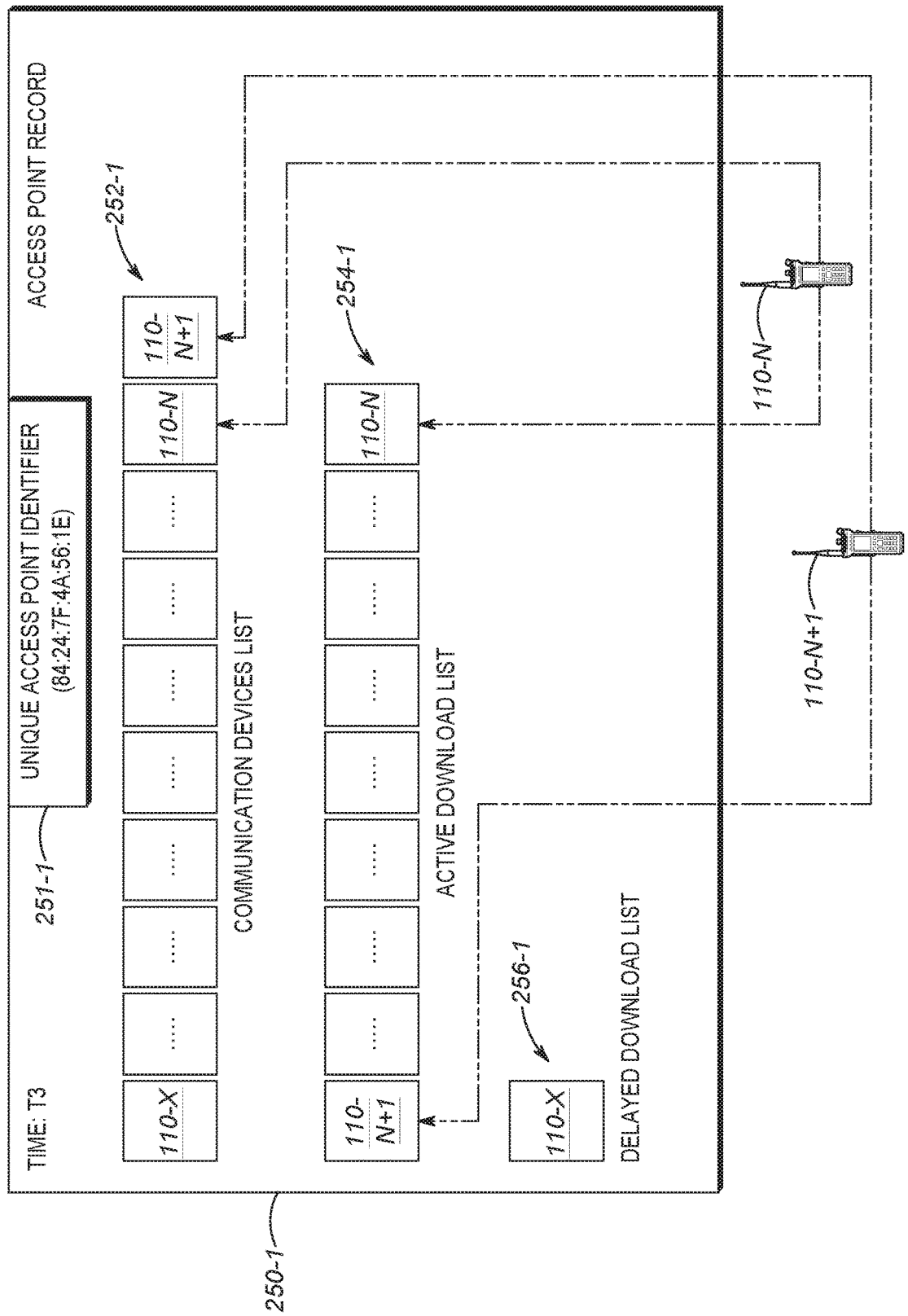

Now referring to FIG. 6, a snapshot of communication devices list 252-1, active download list 254-2, and delayed download list 256-2 that are included in the access point record 250-1 corresponding to the access point 120-1 at time 'T3' is shown. While no new communication device has been included in the communication devices list 252-1 between time 'T2' and 'T3' as shown in FIG. 6, the communication device N+1 which was previously included (i.e., at time 'T2' shown in FIG. 5) in the delayed download list 256-1 is now (i.e., at time 'T3') placed in the active download list 254-1 and removed from the delayed download list 256-1. As previously described with reference to FIG. 4, in one embodiment, a download associated with a communication device 110 already included in the active download list 254-1 could be interrupted to allow another communication device 110 with a higher download priority level to download from the download server 130. For example, assume that an assigned download priority of communication device 110-X already included in the active download list 254-1 is lower than an assigned priority level of communication device 110-N+1. In this case, as shown in FIG. 6, the download server 130 removes the communication device 110-X from the active download list 254-1 and further places the communication device 110-X in the delayed download list 256-1 in order to execute a download service corresponding to the download request associated with the communication device 110-N+1. Removing the communication device 110-X from the active download list 254-1 causes a download associated with the communication device 110-X to be interrupted and further enables the download server 130 to execute the download service corresponding to the download request received from the communication device 110-X. However, the communication device 110-X may be placed in the active download list 254-1 to resume its download when one or more communication devices included in the active download list 254-1 has completed its download.

Figure 7:
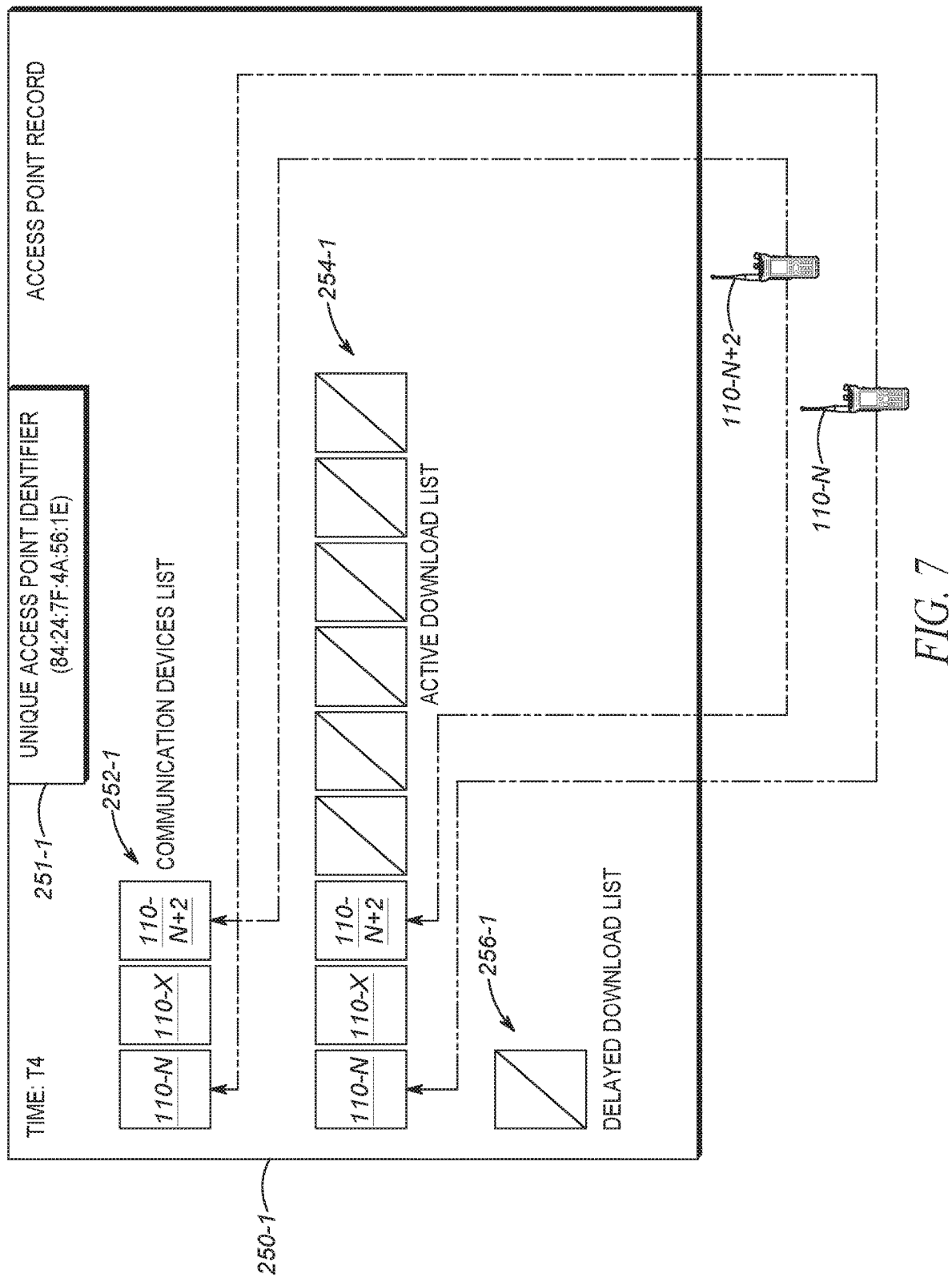

FIG. 7 shows a snapshot of communication devices list 252-1, active download list 254-2, and delayed download list 256-2 that are included in the access point record 250-1 corresponding to the access point 120-1 at time 'T4'. A communication device 110-N+2 is shown in FIG. 7 as the most recent device that sent a download request to the download server 130. In this case, since the received download request includes the unique access point identifier 251-1 of the access point 120-1 to indicate that the communication device 110-N is connected to the download server 130 through the access point 120-1, the download server 130 updates the communication devices list 252-1 of the access point record 250-1 associated with the access point 120-1 to include the communication device 110-N+2. FIG. 7 further shows that communication devices other than 110-N, 110-X, 110-N+2 has been removed from the communication devices list 252-1 at time 'T4'. This may be due to these communication devices completing its download from the download server 130 or terminating its connection from the download server 130 or switching its connection to the download server 130 through a different access point.

In accordance with the process 300 described with reference to FIG. 3, the download server 130 determines whether a count of communication devices 110-N, 110-X, and 110-N+2 included in the communication devices list 252-1 is greater than a predetermined count threshold 'X'. In the example shown in FIG. 7, since the count of communication devices 110-N, 110-X, and 110-N+2 is not greater than 'X', the download server 130 immediately executes a download service corresponding to the download request received from the communication device 110-N+2 by placing the communication device 110-N+2 in the active download list. In this example, since the count of communication devices 110-N, 110-X, and 110-N+2 is not greater than 'X', there are no communication devices included in the delayed download list 256-1. Further, the communication device 110-X which was previously (i.e., at time 'T3') placed in the delayed download list 256-1 to wait for the execution of the download request is now placed again in the active download list 254-1 to resume its download from the download server 130.

Embodiments described herein can be advantageously implemented to reduce congestion at the access points while not making any modifications to the underlying functionality of the access points. Embodiments described herein provide for modification of a download request message transmitted from a communication device to a download server to additionally include a unique access point identifier of the access point with which it is associated. The information related to the unique access point identifier included in the download request message received from the communication device allows the download server to identify a number of communication devices that are connected to the access point and to further determine whether to reduce congestion at the access point by delaying execution of a download service corresponding to the download request. Embodiments described herein may be particularly helpful in scenarios when enterprise servers need to concurrently push out large amount of data such as firmware upgrades to a number of communication devices (e.g., portable radios) that may be located in proximity to each other.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of scheduling downloads for communication devices connected to a download server through an access point, the method comprising:
    maintaining, at the download server, at least one access point record, wherein each access point record is linked to a unique access point identifier of a respective access point and includes a communication devices list to identify communication devices connected to the download server through the respective access point;
    receiving, at the download server, a download request from a first communication device, the download request including a unique access point identifier of a first access point through which the first communication device is connected to the download server;
    identifying, at the download server, an access point record of the at least one access point record that is linked to the unique access point identifier of the first access point through which the first communication device is connected to the download server;
    updating, at the download server, the identified access point record to include the first communication device in the communication devices list included in the identified access point record;
    determining, at the download server, whether a count of communication devices included in the communication devices list of the identified access point is greater than a predetermined count threshold;
    responsive to determining that the count of communication devices included in the communication devices list is greater than the predetermined count threshold, delaying, at the download server, an execution of a download service corresponding to the download request received from the first communication device;
    receiving, at the download server, a second download request from the first communication device, the second download request including a second unique access point identifier of a second access point through which the first communication device is connected to the download server, wherein the second access point is different from the first access point; and
    determining, at the download server, that the first communication device is previously included in the communication devices list included in the access point record associated with the first access point, and responsively removing the first communication device from the communication devices list included in the access point record associated with the first access point.

2. The method of claim 1, further comprising:
    maintaining, at the download server, an active download list to identify communication devices from the communication devices list that are actively downloading from the download server through the first access point.

3. The method of claim 2, wherein delaying an execution of a download service in response to the download request comprises:
    delaying, at the download server, the execution of the download service during a delay period, wherein the delay period corresponds to one of:
        a first time period between receiving the download request and detecting that at least one of the communication devices included in the active download list has completed downloading from the download server, and
        a second time period between receiving the download request and interrupting a download associated with at least one of the communication devices included in the active download list that has an assigned download priority level lower than an assigned download priority of the first communication device.

4. The method of claim 3, further comprising:
    maintaining, at the download server, a delayed download list to identify communication devices from the communication devices list that are waiting to download from the download server; and
    responsive to delaying the execution of the download service, updating the delayed download list to include the first communication device.

5. The method of claim 3, further comprising:
    transmitting, during the delay period, at the download server, a response to the first communication device indicating that the execution of the download service corresponding to the download request received from the first communication device is being delayed.

6. The method of claim 3, further comprising:
    executing, at the end of the delay period, at the download server, the download service corresponding to the download request received from the communication device by (i) transmitting a response to the download request instructing the first communication device to begin downloading from the download server or (ii) transferring download data identified by the download request from the download server to the first communication device.

7. The method of claim 1, further comprising:
responsive to determining that the count of communication devices included in the communication devices list is not greater than the predetermined count threshold, executing, without a delay period, at the download server, the download service corresponding to the download request received from the first communication device.

8. The method of claim 1, further comprising:
identifying, at the download server, an access point record of the at least one access point record that is linked to the second unique access point identifier of the second access point; and
updating, at the download server, the access point record associated with the second access point to include the first communication device in the communication devices list included in the access point record associated with the second access point.

9. The method of claim 1, wherein the access point is a Wi-Fi access point and the unique access point identifier is a medium access control (MAC) address of the Wi-Fi access point.

10. The method of claim 1, wherein the download request corresponds to a request to download a firmware update from the download server.

11. The method of claim 1, wherein the predetermined count threshold corresponds to a maximum number of communication devices that is determined to be able to concurrently download from the download server through the access point while avoiding bandwidth overloading at the access point.

12. A download server, comprising:
a memory that maintains at least one access point record, wherein each access point record is linked to a unique access point identifier of a respective access point and includes a communication devices list to identify communication devices connected to the download server through the respective access point;
a network interface; and
an electronic processor communicatively coupled to the memory and network interface, the electronic processor configured to:
receive, via the network interface, a download request from a first communication device, the download request including a unique access point identifier of a first access point through which the first communication device is connected to the download server;
identify an access point record of the at least one access point record that is linked to the unique access point identifier of the first access point through which the first communication device is connected to the download server;
update the identified access point record to include the first communication device in the communication devices list included in the identified access point record;
determine whether a count of communication devices included in the communication devices list of the identified access point is greater than a predetermined count threshold;
delay an execution of a download service corresponding to the download request received from the first communication when the count of communication devices included in the communication devices list is greater than the predetermined count threshold;
receive a second download request from the first communication device, the second download request including a second unique access point identifier of a second access point through which the first communication device is connected to the download server, wherein the second access point is different from the first access point; and
determine that the first communication device is previously included in the communication devices list included in the access point record associated with the first access point, and responsively remove the first communication device from the communication devices list included in the access point record associated with the first access point.

13. The download server of claim 12, wherein the memory further maintains an active download list to identify communication devices from the communication devices list that are actively downloading from the download server through the first access point.

14. The download server of claim 13, wherein the electronic processor is configured to delay the execution of the download service during a delay period, wherein the delay period corresponds to one of:
a first time period between receiving the download request and detecting that at least one of the communication devices included in the active download list has completed downloading from the download server, and
a second time period between receiving the download request and interrupting a download associated with at least one of the communication devices included in the active download list that has an assigned download priority level lower than an assigned download priority level of the first communication device.

15. The download server of claim 14, wherein the memory maintains a delayed download list to identify communication devices from the communication devices list that are waiting to download from the download server, and further wherein the electronic processor is configured to update the delayed download list to include the first communication device when it is determined to delay the execution of the download service corresponding to the download request received from the first communication device.

16. The download server of claim 15, wherein the electronic processor is configured to transmit, during the delay period, via the network interface, a response to the first communication device indicating that the execution of the download service corresponding to the download request received from the first communication device is being delayed.

17. The download server of claim 14, wherein the electronic processor is configured to:
execute, at the end of the delay period, the download service corresponding to the download request received from the communication device by (i) transmitting, via the network interface, a response to the download request instructing the first communication device to begin downloading from the download server or (ii) transferring, via the network interface, download data identified by the download request to the first communication device.

18. The download server of claim 12, wherein the electronic processor is configured to:
execute, without a delay period, the download service corresponding to the download request received from the first communication device when it is determined that the count of communication devices included in the communication devices list is not greater than the predetermined count threshold.

19. The download server of claim 12, wherein the access point is a Wi-Fi access point and the unique access point identifier is a medium access control (MAC) address of the Wi-Fi access point.

\* \* \* \* \*